United States Patent
Goletto et al.

(10) Patent No.: US 9,670,664 B2
(45) Date of Patent: Jun. 6, 2017

(54) HIGH PERFORMANCE THERMAL INSULATION PRODUCTS

(71) Applicant: SAINT-GOBAIN ISOVER, Courbevoie (FR)

(72) Inventors: Valerie Goletto, Paris (FR); Tamar Saison, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 85 days.

(21) Appl. No.: 14/404,194

(22) PCT Filed: May 31, 2013

(86) PCT No.: PCT/FR2013/051232
§ 371 (c)(1),
(2) Date: Nov. 26, 2014

(87) PCT Pub. No.: WO2013/182786
PCT Pub. Date: Dec. 12, 2013

(65) Prior Publication Data
US 2015/0159365 A1    Jun. 11, 2015

(30) Foreign Application Priority Data

Jun. 5, 2012   (FR) ..................................... 12 55200

(51) Int. Cl.
| F16L 59/00 | (2006.01) |
| C04B 14/26 | (2006.01) |
| C04B 38/10 | (2006.01) |
| C08J 9/00 | (2006.01) |
| C08J 9/30 | (2006.01) |
| E04B 1/76 | (2006.01) |
| C04B 111/28 | (2006.01) |

(52) U.S. Cl.
CPC ................ E04B 1/76 (2013.01); C04B 14/26 (2013.01); C04B 38/10 (2013.01); C04B 38/106 (2013.01); C08J 9/00 (2013.01); C04B 2111/28 (2013.01); C08J 2300/00 (2013.01)

(58) Field of Classification Search
CPC ............ E04B 1/76; B08J 9/00; B08J 2300/00
See application file for complete search history.

(56) References Cited

U.S. PATENT DOCUMENTS

| 5,230,734 A * | 7/1993 | Kumasaka | C01F 11/18 |
| | | | 106/464 |
| 2004/0077738 A1 | 4/2004 | Field et al. | |
| 2011/0002870 A1 | 1/2011 | Costa-Casellas et al. | |
| 2011/0178209 A1 | 7/2011 | Ganpule | |
| 2012/0097907 A1 | 4/2012 | Bauer et al. | |
| 2012/0326071 A1 | 12/2012 | Pasquero et al. | |
| 2015/0044469 A1 * | 2/2015 | Lorgouilloux | C01F 5/24 |
| | | | 428/402 |

FOREIGN PATENT DOCUMENTS

| BE | 1020577 | 1/2014 |
| CN | 102070320 | * 5/2011 |
| EP | 2 246 318 | 11/2010 |
| WO | WO 96/25475 | 8/1996 |
| WO | 03 097227 | 11/2003 |
| WO | 2010 046909 | 4/2010 |
| WO | 2010 126792 | 11/2010 |
| WO | 2011 095745 | 8/2011 |

OTHER PUBLICATIONS

Translation for CN 102070320, May 25, 2011.*
International Search Report Issued Aug. 13, 2013 in PCT/FR13/051232 Filed May 31, 2013.

* cited by examiner

*Primary Examiner* — Carol M Koslow
(74) *Attorney, Agent, or Firm* — Oblon, McClelland, Maier & Neustadt, L.L.P.

(57) ABSTRACT

The manufacture of a thermal insulating product whereby a foam is produced from a mixture of mineral particles, the product is shaped, and the foam is dried. Specifically, the foam is produced from a crystallized calcic part and a crystallized magnesian part, and a composite aggregate of the crystals of the calcic and magnesian part is formed. The calcic part is chosen from calcite and/or aragonite, and the magnesian part is made of hydromagnesite.

20 Claims, No Drawings

HIGH PERFORMANCE THERMAL INSULATION PRODUCTS

The present invention relates to a high performance thermal insulation product or material, to its process of manufacture and to its use in the field of the construction industry for insulating walls (exterior or interior) of buildings or to insulate any roof or to plug chinks in materials (cavity walls, pipes, and the like), it being possible for this insulating product to be provided in the form of panels, or optionally in the form of granules or aggregates, blocks, layers, sprayed materials, molded materials, and the like.

Whether the new or renovation market is concerned, the demand for effective insulation products, in particular thermal insulation products, is as great as ever. In addition to enhanced insulation properties and observing the specifications for structures of the building industry, the demand for products offering greater comfort of use, greater durability, greater savings in raw material, and the like, from the view point in particular of sustainable development, is also increasing. It is particularly advantageous, in this search for materials offering better thermal insulation, for said materials to also exhibit, indeed even to improve, other properties desired in the construction of buildings, in particular as regards lightening of load, mechanical strength, sound insulation, and the like.

A great variety of thermal insulating materials are currently known. Mention may be made, among the commonest products, of fibrous insulating materials, based on natural or synthetic fibers, such as glass wool or rock wool, cellular insulating materials of the expanded polymer type, such as expanded or extruded polystyrene, or phenolic or polyurethane foams. The thermal performances of essentially mineral insulating materials are reflected by thermal conductivity $\lambda$ values commonly greater than 35 mW/m·K, in particular of the order of 40 mW/m·K, values which can be lower in the case of essentially organic insulating materials, for example in the case of cellular insulating materials incorporating a gas having a lower thermal conductivity than air in order to improve the thermal performances. One disadvantage of these materials is, however, the difficulty of retaining the gas within the matrix over time, the material losing, on aging, a portion of its thermal performance. Moreover, for organic insulating materials, the reaction to fire is poor due to their nature.

It is also possible to have recourse to materials in which a vacuum has been produced, so as to form, for example, vacuum panels. These insulating materials are difficult to use as they can neither be cut up nor pierced and they can undergo a gradual loss of the vacuum over long periods of time.

Mention may also be made, as insulating materials, of aerogels, generally in the form of translucent granules or of fine powder, which are particularly effective in terms of thermal insulation but have weak mechanical properties which require that they be used with protections or a reinforcing agent, or aerogels within mats (or laps) formed of entangled (mechanically resistant) fibers for which it can be difficult to give a predetermined shape. These aerogels are difficult and expensive to obtain on the industrial scale, they require problematic drying conditions and their combination with other insulating materials in order to obtain an appropriate mechanical strength or an appropriate shape can be complex. Their use thus remains limited.

There consequently exists a strong demand to develop products or materials which are effective in terms of thermal insulation but which are easier and less expensive to manufacture industrially than aerogels in particular. In addition to its good thermal performance (improved with respect to common mineral products), it is desirable for the product to exhibit good resistance (in particular to aging, or in terms of mechanical strength or other strength: chemical resistance, fire resistance, and the like). It is also desirable for these improvements to take place without rendering the load of product heavier, a lightened product being preferably desired. It is also desirable for it to remain easy to spread during its hardening and to make possible the preparation of all the desirable shapes, in particular by molding (or optionally by spreading or spraying a layer).

The present invention has thus developed novel insulating products (or materials) which make it possible to achieve this aim and to overcome the abovementioned disadvantages, these novel materials being essentially mineral, being obtained directly (without having to resort to a chemical reaction which modifies their chemical composition) from mineral particles having an (or possessing an) advantageously submicronic porosity (that is to say, comprising pores with diameters of less than 1 µm), in particular from mineral carbonate particles, these carbonates exhibiting in particular the advantage of being relatively inexpensive starting materials. However, as it is possible for the materials obtained from normal carbonates to crack on drying during their preparation and as they are less effective than those obtained from other inorganic microporous starting materials, such as silica particles, the present invention has sought more particularly to obtain insulating products based on more effective carbonates, these products exhibiting both resistance (in particular to fire) and strength (in particular mechanical strength, the materials especially not cracking on drying) and good thermal performances (at least equivalent to those of conventional organic foams made of expanded polystyrene or of polyurethane, the thermal conductivity values of which are at least less than 35 mW/m·K and in addition being light and economical.

The present invention meets the preceding objectives by providing a novel thermal insulating product and an advantageous process for obtaining said product, this process comprising the following stages (or steps):

at least one stage of producing a foam (aqueous (or wet)) from a mixture (or assembly), generally aqueous (dispersion, in particular suspension, in water), (based on or) of mixed mineral (solid) particles (based on magnesium and calcium carbonates), these particles being formed of a crystallized calcic part and of a crystallized magnesian part (in particular in the form of platelets (or small plaques or tablets)), the crystals of the calcic part and those of the magnesian part being aggregated in the form of composite aggregates (these aggregates being themselves or having been at least partially agglomerated in the form of agglomerates), said calcic part comprising at least one carbonate chosen from the group consisting of calcite, aragonite and their mixtures and said magnesian part comprising hydromagnesite (advantageously in the platelet form), these particles advantageously exhibiting a bulk density (measured in particular according to standard EN459.2) of greater than or equal to 100 kg/m$^3$ and less than or equal to 250 kg/m$^3$, and advantageously exhibiting a specific surface S of greater than 5 m$^2$/g, in particular of greater than 20 m$^2$/g;

at least one stage of shaping (generally in order to form a monolith and/or a layer), in particular by molding or casting or spraying this foam (over a surface or wall);

at least one stage of at least partial drying (by leaving to dry or by drying) of the foam or material thus obtained.

The present invention also relates to a novel thermal insulating product (or material), at least in the form of a rigid and/or solid foam (that is to say, in the form of a foam or comprising at least one foam, or based on at least one foam), formed from (or made from, or based on, or formed of) mixed mineral particles (advantageously of submicronic porosity) (based on magnesium and calcium carbonates) formed of a crystallized calcic part and of a crystallized magnesian part (advantageously in the form of platelets), the crystals of the calcic part and those of the magnesian part being aggregated in the form of composite aggregates (these aggregates being themselves and/or having been at least partially agglomerated in the form of agglomerates), said calcic part comprising at least one carbonate chosen from the group consisting of calcite, aragonite and their mixtures and said magnesian part comprising hydromagnesite (advantageously in the platelet form), these particles advantageously exhibiting a bulk density of greater than or equal to 100 kg/m$^3$ and less than or equal to 250 kg/m$^3$, this product exhibiting both a good strength and resistance and improved thermal properties (in particular with respect to materials obtained from particles of carbonates not meeting the preceding definition) as desired according to the invention.

Advantageously, the particles selected in the present invention are such that they exhibit a submicronic porosity, this porosity being composed of ("submicronic") pores with diameters (that is to say exhibiting a distribution in diameters) of between 10 nm and less than 1 μm (that is to say that each pore of this category exhibits a diameter within this range, the distribution of the assembly of the diameters of these pores being more or less narrow), in particular between 100 nm and less than 1 μm, especially between 500 nm and less than 1 μm.

The particles are also advantageously micronic in size (it should be noted that the particles, before being dispersed in a medium (dispersion used in the process according to the invention), are generally provided in the form of a powder, each powder grain, with a size generally of the order of one to several millimeters, being formed of a greater or lesser number of optionally agglomerated particles), that is to say that these particles advantageously exhibit a size (the median diameter D50—or diameter of at least 50% (by weight) of the particles—is considered here) of at least 500 nm, preferably of at least 750 nm, particularly preferably of at least 900 nm, in particular of at least 1 μm, especially of a few micrometers (in particular between 0.5 μm (or 1 μm) and 6 μm, for example approximately 2-3 μm).

Advantageously again, the bulk density of the particles (or apparent density/volumic mass of the particles, mixed with air) is greater than or equal to 100 kg/m$^3$ and less than or equal to 250 kg/m$^3$, in particular less than 200 kg/m$^3$, and the density (volumic mass) of the cake obtained by drying, at 40° C., a dispersion of these particles in water is less than 600 kg/m$^3$ and preferably less than 450 kg/m$^3$.

In addition, the pore volume of the submicronic pores of the particles is preferably at least 0.8 cm$^3$/g (that is to say, 0.8 cm$^3$ per gram of material), in particular at least 1 cm$^3$/g (indeed even at least 1.3 cm$^3$/g), and can range up to at least 2 cm$^3$/g or up to 2.3 cm$^3$/g in particular.

In addition, the particles advantageously have a specific surface S of greater than 5 m$^2$/g, preferably of greater than 15 m$^2$/g and in particular of greater than 20 m$^2$/g.

Advantageously, the density (apparent or overall, that is to say measured over the whole of the product) of the insulating product or material obtained is less than 300 kg/m$^3$, in particular less than 200 kg/m$^3$, especially less than 150 kg/m$^3$, indeed even, if appropriate, less than 100 kg/m$^3$.

Stable products (carbonate foams), exhibiting good strength and good thermal insulation properties, as clarified and illustrated subsequently, while remaining economical, are obtained in accordance with the invention. In particular, stabilization of the particles and of the interfaces of the foam (the interfaces of the foam being stabilized by the submicronic particles chosen) is observed, making possible good shaping of the foam and good stability of the particles and of the wet foam (in particular with regard to drainage, Ostwald ripening, coalescence, and the like), the stability of this wet foam being important since it makes it possible to retain the porous structure during its drying and thus to obtain a cohesive/solid foam (conversely, insulating particles of aerogel type would not make it possible to obtain such a cohesive/solid foam, these particles opposing the foaming or having a tendency to bring about collapse of the foam formed independently). Moreover, the process according to the invention makes it possible to control the size of the bubbles of the foam and the fraction of air incorporated, also allowing the preparation of lightened/controlled-density foams). The materials obtained do not crack on drying and are subject to reduced densification.

The process according to the invention can comprise a preliminary stage of preparation of the abovementioned mixture of mineral particles (in particular by suspension (of the powder formed) of the particles in water), or this mixture (in particular aqueous mixture) may have been prepared beforehand independently of the process and be a ready-to-use mixture incorporating said particles.

Advantageously, the mixture of particles is such that the solids content and in particular such that the proportion of abovementioned particles is at least 15% by weight, in particular at least 16% by weight, of the mixture and is generally less than 40% by weight, in particular less than 35% by weight, of the mixture.

The foam comprising the particles/the mixture of particles (starting from said mixture or said particles) can be prepared:
- by direct foaming: that is to say, by the introduction of a gas into the mixture of particles by various methods, such as: mechanical stirring, the bubbling of a gas, for example through a sintered glass (porous plate through which the gas is passed in order to generate the foam), the in situ bubbling of a dissolved gas (for example pentane) or of a gas by chemical reaction, in particular by decomposition (for example aqueous hydrogen peroxide solution and molecular oxygen), and the like, and/or
- by incorporation: that is to say the incorporation in the mixture of particles (in dispersion) of an already preformed aqueous foam, for example prepared by foaming using an aqueous solution into which a gas is introduced by one of the above methods, the foaming itself generally being carried out in the presence of at least one surfactant (added to the mixture of particles in the case of the direct foaming, or the surfactant being present in the solution which is foamed in order to form the aqueous foam, in the case of the incorporation).

Advantageously, in the process according to the invention, just one drying stage is carried out after the stage of employing the foam (in particular in the vicinity of 40° C. or more, for example in the vicinity of 80° C.); the process is in addition advantageously devoid of a sintering stage, it being possible for an additional drying or a sintering operation to result in a densification of the product harmful to the achievement of the desired thermal properties.

The thermal insulating product according to the invention advantageously incorporates (or comprises or combines) two different (or distinct) ranges of porosities, including a first range ("macroporosity" range), consisting of pores ("macropores") with diameters (that is to say, exhibiting a distribution in diameters) of between 10 microns and 3 millimeters, in particular of between a few tens and a few hundred microns (and in particular between 10 and 500 µm), and a second range ("submicronic porosity" range) consisting of pores ("submicronic" pores) already mentioned above. These two porosities/types of pores differ significantly in their size (described in this case by their diameter), the pores of one category (such as the submicronic pores) being present between the pores of another category (such as the macropores). Advantageously, only (these) two porosities/types of pores are present (or at least are predominant) in the product; however, it is not ruled out for the product to be able to comprise more than two porosities/types of pores. The diameter which makes it possible to describe the submicronic pores is calculated from the measurements of pore volumes by mercury intrusion porosimetry using the Washburn equation, the diameter of the macropores being measured by a scanning electron microscope (SEM) or by X-ray tomography.

The product exhibits, as already mentioned in connection with the particles, submicronic pores (and is formed of particles exhibiting submicronic pores) with diameters between 10 nm and less than 1 µm, in particular between 100 nm and less than 1 µm (the diameters varying within these limits according to the initial particles used, for example according to their specific surface, it being possible in addition for the distribution in diameters to be more or less narrow), the pore volume for these submicronic pores advantageously being greater than 0.8 cm$^3$/g (it being possible for the submicronic pore volume in the product to decrease slightly with respect to that of the initial particles used but remaining in any case greater than 0.8 cm$^3$/g). For the macropores, the pore volume is preferably greater than 1 cm$^3$/g (that is to say, 1 cm$^3$ per gram of material), preferably greater than 3 cm$^3$/g and in particular varies from 5 to 15 cm$^3$/g.

The pore volume for the submicronic pores ($V_{sm}$) is determined by mercury porosimetry carried out on devices bearing the reference Pascal 140 and Pascal 440, sold by Thermo Scientific, and is regarded as being equal to the cumulative volume of mercury introduced into the pores for mercury pressures of greater than 1.47 MPa (pressure calculated by the Washburn equation—Washburn 1921—for a pore diameter of 1 micron) and ranging in particular up to 400 MPa with the abovementioned devices, the pores being assumed to be cylindrical, the surface tension of the mercury being assumed to be equal to 480 dynes/cm and the mineral particles/mercury contact angle being assumed to be equal to 140°, the pore volume being given in cm$^3$ per gram of material. The pore volume of the macropores ($V_m$) is determined by the formula:

$$V_m = 1/\rho_a - 1/\rho_f - V_{sm}$$

$\rho_a$ being the apparent density of the material (corresponding to the ratio of its weight to its volume), $1/\rho_a$ being the specific volume of the material, $\rho_f$ being the density of the (predominantly) mineral framework (part of the product occupied by the dense/pore-free material), measured by helium pycnometer (ASTM C604 standard—"Standard test method for true specific gravity of refractory materials by gas-comparison pycnometer"), and $1/\rho_f$ being the specific volume of the framework.

The total pore volume ($V_p = V_m + V_{sm}$) of the thermal insulating material (or product) according to the invention is advantageously greater than 1.8 cm$^3$/g and preferably between 5.5 and 18 cm$^3$/g.

The creation of an air-imprisoning submicronic porosity (or pore volume on the submicronic scale) in a structure (a foam) already exhibiting (macro)pores (this macroporosity resulting in particular from the foaming and corresponding to the air bubbles introduced) and in the zones (or "walls") between said (macro)pores (these walls, of a few micrometers in thickness in particular, being formed and stabilized by the particles selected as clarified above) improves the thermal performance of the product while giving a comparatively lighter product as a result of the presence of these additional pores, this additional porosity in the walls of the foam being contributed in particular by the intraparticulate porosity (initially present in the particles used and resulting in particular from their synthesis) and also resulting from the stacking of these porous particles in order to form the walls of the foam (interparticulate porosity). The foams thus obtained according to the invention exhibit improved thermal insulation properties with respect to more conventional inorganic foams of the same density or with respect to common organic cellular insulating materials of polystyrene type, while being (more) economical and remaining light and while exhibiting a better resistance to aging and to fire than organic products with equivalent thermal insulation performances. The products/foams according to the invention are compatible both for use as plugging material and for use at the surface, in particular as a façade.

The thermal insulating product according to the invention is thus provided in the form of (at least) one solid and generally rigid foam based on porous particles and is, as already mentioned, obtained in particular from the mixture of at least the following components: water (or optionally an aqueous foam), abovementioned particles (according to the definition of the invention) having a submicronic porosity (generally in dispersion/suspension (in water)), said particles preferably exhibiting (initially, as introduced into the mixture) a specific surface S of at least 5 m$^2$/g (the specific surface being given in m$^2$ per gram of particle(s)), in particular of greater than 20 m$^2$/g, and, if appropriate, (at least) one surfactant and/or optionally an organic binder and/or a mineral binder and/or fibers (or reinforcers), and the like, as clarified subsequently. Instead of "thermal insulting product", it is thus also possible to define, if appropriate, the product according to the invention as "a foam intended for thermal insulation", this foam being solid and generally rigid, and inorganic (predominantly, as indicated subsequently), this foam (forming the abovementioned product according to the invention) being formed of particles as mentioned above according to the invention.

The thermal performance of the insulating material according to the invention is reflected by (overall) thermal conductivity λ values of less than 40 mW/m·K, especially of between 20 and 40 mW/m·K (approximately), in particular of less than 35 mW/m·K (approximately), descending in particular down to 30 mW/m·K, indeed even less (the thermal performance becoming better as the thermal conductivity becomes lower). The thermal conductivity λ (in W/m·K) represents the amount of heat passing through the insulating material (with a thickness of one meter, per m$^2$ and when the temperature difference between the two faces is 1° K.). The thermal conductivity λ values (compared at identical temperature and identical pressure, in particular at atmospheric pressure (1 bar) and ambient temperature, are measured in the context of the invention with a fluxmeter of the HFM 436 series from Netzsch™ while following the protocols established by the standards ASTM C518 and ISO 8301. The characterization temperature is of the order of 25° C. and the measurements are carried out at atmospheric pressure, the accuracy of the measurements being estimated at 5%.

The product according to the invention is easier to obtain than aerogels (which in particular do not bring about the two-fold porosity defined above) or other inorganic foams obtained by starting from precursors/starting materials and by carrying out a chemical reaction in order to form the mineral substance forming them (whereas, in the case of the product according to the invention, the mineral substance employed—the particles—is already formed and simply shaped without resorting to treatments targeted at decomposing them or at modifying their chemical composition, as is apparent in the process according to the invention). The porous structure of the product according to the invention and/or said product is thus advantageously formed without a chemical reaction or detrimental change, as are mentioned above. The same observation may be made in comparison with meso- or nanoporous structures or foams existing in other fields or applications (for example used for molecular sieves and obtained, for example, by the sol-gel route from precursors) which, with different specificities and constraints, result in particular from chemical reactions or mechanical operations of decomposition. The product according to the invention is in particular obtained by a process which is simpler and economical to carry out.

The apparent density of the product (or foam) according to the invention is advantageously less than 300 kg/m$^3$, it being possible for this density to vary according to the formulation (additives, pH, and the like) and the foaming conditions (foaming time, stirring speed, vessel and paddle geometry, and the like). The density is determined by establishing the ratio of the weight of a given volume of the material to said volume. Generally, the density of the insulating product according to the invention is less than or equal to 200 kg/m$^3$, in particular less than 150 kg/m$^3$, advantageously less than 130 kg/m$^3$, indeed even less than 100 kg/m$^3$.

The product according to the invention is predominantly (to at least 80% by weight, indeed even at least 90%), indeed even solely, mineral/inorganic (it being possible for the organic materials possibly present to be, if appropriate, an organic binder, an organic grafting, and the like), which makes it possible to provide in particular good fire resistance. In addition, the product is essentially (to at least 80% by weight, indeed even at least 90%) formed of the abovementioned particles as shaped into a foam structure. These particles are solid and porous and are used directly to form the product without modification to their formula.

The abovementioned particles are generally (initially) in the form of a powder (each grain generally being formed of an assembly of particles) and exhibit a particle size preferably varying from 0.5 μm to 200 μm (in particular between 1 and 100 μm) with a median diameter D50 generally of the order of a few micrometers, this diameter being measured by particle size analysis by laser diffraction according to the standard ISO 13320-1:2000 in particular. The powder is, if appropriate, dispersed, in particular in water (it being possible for oil in particular to also be added, for example for a surfactant and consolidation effect, and/or a binder in particular), and used (or incorporated) in the form of said dispersion in order to form the product according to the invention, the content of particles dispersed/suspended (the particles dispersing in the medium) in water advantageously being at least 15% by weight, in particular at least 16% by weight (with respect to the dispersion).

The initial specific surface S of these particles is advantageously greater than 5 m$^2$/g, in particular greater than 10 m$^2$/g, especially greater than 20 m$^2$/g, this specific surface ranging in particular up to 30 m$^2$/g.

The specific surfaces, expressed in m$^2$/g, are measured by nitrogen adsorption (theory of the multiple adsorption of gases using Brunauer, Emmet and Teller determinations—BET method) in accordance with the standard ISO 9277:2010.

The particles of carbonates corresponding to the definition according to the invention are in particular particles of carbonates obtained by synthesis, especially by precipitation. The magnesian part forming said particles is preferably crystallized in the form of platelets (and in particular comprises hydromagnesite in the platelet form), the crystals of the calcic part and those of the magnesian part being aggregated in the form of composite aggregates and these aggregates being themselves and/or having been at least partially agglomerated in the form of agglomerates.

The magnesian part forming the particles can also comprise one or more other magnesian/magnesium compounds, in particular periclase and/or magnesium oxyhydroxide and/or brucite. The hydromagnesite present in the magnesian part is in particular of formula $Mg_5(CO_3)_4(OH)_2.4H_2O$ and is advantageously present at a content of between 10 and 60% by weight, with respect to the weight of the particles.

The calcic part forming the particles can also comprise calcium hydroxide, for example in the form of portlandite. The calcic part is advantageously present in an amount ranging from 35% to 75% by weight, with respect to the total weight of the particles, and the magnesian part is advantageously present in an amount ranging from 25% to 65% by weight, with respect to the total weight of the particles. Preferably again, the Ca/Mg molar ratio in the composition of the particles is between 0.4 and 1.2.

Advantageously, the composite aggregates forming the particles are composed of a calcic core on which hydromagnesite platelets are aggregated.

The particles can be obtained in particular by milling agglomerates, obtained in particular by synthesis, to give smaller agglomerates and/or aggregates, if appropriate in several stages (for example, at a size of less than or equal to 2 mm, and/or at a smaller size, the powder grains generally obtained after milling being formed of assemblies, optionally of agglomerates, of particles). Preferably, the mineral substance forming said agglomerates is obtained according to the method of synthesis described in patent application BE2012/0199 filed in Belgium on 22 Mar. 2012 by Lhoist, which is published as Belgian Publication No. 1020577A3 and incorporated here by reference.

In addition to the mineral particles, the material according to the invention is formed from water or from an aqueous phase (the presence of another medium also, for example oil and/or an alcohol, in particular glycerol, not being ruled out), which medium(s) is (are) foamed in order to form an aqueous foam (or liquid having a soapy appearance, obtained by a disorderly stacking of gas bubbles in an aqueous phase), the starting aqueous phase, not yet foamed, in addition advantageously comprising at least one surfactant compound as indicated above.

Use may be made, as surfactant (or foaming agent), of at least one (salt of) anionic surfactant, in particular selected from one of the following compounds of general formula R—X⁻Y⁺, for which R is an aliphatic chain of 10 to 24 carbon atoms, X⁻ is a group carrying a negative charge (carboxylate, sulfate or sulfonate group, and the like) and Y⁺ is a countercation selected from ammonium, sodium and potassium groups, for example salts of carboxylates comprising from 12 to 24 carbon atoms, selected in particular from salts of myristate, of palmitate, stearate, of oleate or of the conjugate base of behenic acid, or carboxylates resulting from the treatment of tallow fatty acids, or also of other conjugate bases of fatty acids, such as, for example, soaps/shower gels comprising fatty acids resulting from natural sources, such as tallow, coconut oil, and the like, for example surfactants such as ammonium stearate, and the like.

Use may also or alternatively be made of at least one cationic surfactant salt selected, for example, from alkyltrimethylammonium salts comprising an alkyl group comprising from 10 to 22 carbon atoms, in particular from at least one of the following compounds: dodecyltrimethylammonium bromide (or chloride), tetradecyltrimethylammonium bromide (or chloride), hexadecyltrimethylammonium bromide (or chloride), octadecyltrimethylammonium bromide (or chloride), cetyltrimethylammonium bromide (or chloride), cetylbenzyldimethylammonium chloride, cetyltriethylammonium bromide, tallowtrimethylammonium chloride, and the like.

In the case of the use of an anionic surfactant and of a cationic surfactant jointly, an aqueous foam can be prepared, for example, as described in application publication no. WO/1996/025475 or starting from the two-component kits sold by Allied Foam (referenced, for example: 425A and 510B), consisting of a first aqueous mixture comprising an anionic surfactant and of a second aqueous mixture comprising a cationic surfactant and a latex, and the like.

Use may also be made, as surfactant(s), of one or more zwitterions. Mention may in particular be made, among zwitterions, of amino acids or derivatives, molecules synthesized from amino acids, and the like.

Generally, the mixture (for the production of the insulating product or the mixture of particles) or the (aqueous phase giving the) aqueous foam comprises less than 5% (by weight), advantageously less than 2%, indeed even less than 1%, of surfactant, preferably anionic surfactant, and/or of zwitterions(s) (the minimum content of surfactant(s) generally being at least 0.08%, with respect to the mixture, or at least 0.1%, with respect to the water).

It is also possible to add other additives (generally to the mixture of particles or the mixture used to obtain the foam/the product according to the invention or to the foam), such as rheological agents (plasticizer, such as glycerol, and the like), mineral fillers or other materials which reinforce the mechanical strength (glass or organic fibers, silicate, gypsum, cement, organic binders of latex type, as clarified below, and the like) or which limit the disproportionation of the bubbles and reduce their size (the foaming being, for example, carried out under a perfluorohexane atmosphere), and the like.

In particular, in order to prevent ripening, it is possible to advantageously add cosurfactants of cationic surfactant or cationic polymer type, or saponins, or nonionic polymers of cellulose ether type (such as hydroxypropylmethylcellulose).

The mixture (in order to obtain the insulating product or the mixture of particles) can also comprise at least one organic and/or mineral binder used, for example, to make possible the binding of the particles to one another and/or the binding of the particles to the remainder of the structure of the material.

In order to mechanically reinforce the foam in particular, the binder can be an organic binder, as indicated above; in particular, it can advantageously be a latex (in particular chosen from those having a tendency to form films), in particular an aqueous dispersion or emulsion of one or more natural or synthetic polymeric substances, generally thermoplastic polymeric substances. This latex binder preferably has a glass transition temperature Tg of less than 50° C., in particular between −50° C. and 25° C., preferably between −20° C. and 10° C., advantageously between −10° C. and 0° C., and preferably has a film-forming temperature of less than ambient temperature, for the purpose of obtaining the strength desired for the insulating materials to be applied to a support in the field of the construction of buildings in particular. The latex can include a (co)polymer of vinyl type (for example based on vinyl acetate, in particular on polyvinyl acetate homopolymer, or on copolymer of vinyl acetate and of (meth)acrylic or maleic acid and/or ester, of olefin and/or of vinyl chloride, or based on vinyl chloride/ethylene copolymer) or of acrylic type (in particular an acrylonitrile/acrylic ester copolymer or styrene/acrylic acid or ester which is silanized and/or derivative of carboxylic acid copolymer). The latex can in particular be a styrene/acrylic or all acrylic copolymer. These latexes are, for example, those sold by BASF in the range referenced by the name Acronal®, in particular Acronal®S 400.

In particular, the thermal insulating product according to the invention can be prepared from at least one of the following components, in the amounts expressed as percentage by weight with respect to the total weight of the mixture: from 43 to 85% of water, from 15 to 37% of abovementioned mineral particles of carbonates and from 0 to 20%, in particular from 1 to 20%, of additive(s) (binder, surfactant, and the like).

The shaping stage generally comprises operations of casting or molding the foam comprising the particles in cavities of appropriate shape or cross section or of spraying the foam onto a surface or wall. The term "molding" is to be taken in the broad sense and covers any type of configuration, such as casting in an open mold, extrusion through a die and cutting of the extrudate, and the like, the drying generally being consecutive to the shaping.

The process according to the invention advantageously does not require and even excludes, after drying, any heat treatment for consolidation of the material which can densify the product and damage the thermal performance.

The thermal insulating product obtained is solid (and generally rigid) and multi- (in particular bi-) porous. It is generally (designed) in the form of a panel, the thickness of which is at least equal to 5 mm. It can also be obtained in the form of at least one layer (applied, for example, to a plasterboard), or the material, still in the wet state, can be impregnated or spread over a web (for example, a nonwoven, and the like), or the material can be combined with a matrix of fibers or other layer, and the like.

The present invention also relates to the use of the insulating product/the foam according to the invention in the field of the construction industry, for insulating in particular walls of buildings or insulating beneath the roof.

A better understanding of the present invention and its advantages will be obtained on reading the examples described below, by way of illustration and without implied limitation:

EXAMPLE ACCORDING TO THE INVENTION

In this example, a carbonate foam was manufactured from particles of carbonates, which particles are formed of a crystallized calcic part and of a crystallized magnesian part in the following proportions: 56% of $CaCO_3$, 41% of which in the calcite form and 15% of which in the aragonite form, 42% of hydromagnesite in the platelet form, 0.5% of brucite and 1.1% of portlandite. The bulk density of the particles was 188 kg/m$^3$ approximately and the specific surface was 27.3 m$^2$/g. These particles exhibited a size of 3.77 μm (d50) and submicronic pores with diameters of greater than 100 nm and less than 1 micron and with a pore volume of 1.07 cm$^3$/g.

The procedure was carried out as follows: 26.25 g of the abovementioned powder (particles) of carbonate were dispersed in 161.25 g of water using an IKA paddle (propeller stirrer) and then 5.83 g of a latex (organic binder) sold by BASF under the reference Acronal 5400 were added to this dispersion. The mixture was homogenized using an IKA paddle at the speed of 1500 rev/min.

An aqueous foam was prepared in a second container starting from two solutions of surfactants sold by Allied Foam under the references AFT 425A and AFT 510B and composed as follows:
reference AFT 425A, consisting of (percentages by weight):
Mixture of cationic surfactants belonging to the category of the long-chain alkyls: 50-60%
Mixture of nonionic phenoxyl surfactants: 10-20%
Ethanol: 5-8%
Water: 12-35%
reference AFT 510B, consisting of:
Mixture of acrylic polymers: 25-35%
Mixture of anionic surfactants belonging to the category of the fatty acids: 15-30%
Water: 35-60%

10 g of AFT 425A were withdrawn and 100 g of water were added thereto. The mixture was made to foam by mechanical action using a food processor of the Kenwood brand for 3 min at maximum speed. 20 g of the solution AFT 510B were subsequently added with stirring over approximately 1 min and the combined product was mixed for 3 min 30 at maximum speed using the food processor.

In order to prepare the carbonate foam, 9.45 g of the resulting liquid foam were withdrawn and were introduced, using a spatula, into the aqueous dispersion based on carbonate and Acronal 5400. The combined product was homogenized using the IKA paddle at the speed of 600 rev/min.

The wet foam was subsequently poured into a Teflon mold and placed in an oven at 40° C. overnight.

The product according to the invention, obtained in the form of a solid/rigid foam exhibiting two ranges of porosities (in particular macropores with diameters of between 10 μm and 3 mm and submicronic pores with diameters of greater than 100 nm and less than 1 micron), was characterized according to the methods mentioned above in the text, the values obtained being as follows:
Density: 103 kg/m$^3$;
Submicronic pore volume: 0.84 cm$^3$/g
Thermal conductivity: 33 mW/m·K±5%

The values indicated above show that the thermal insulating inorganic products obtained exhibit a low density at the same time as an advantageous thermal performance.

Comparative Example 1

The procedure carried out was the same as in the preceding example, the carbonate of said example being replaced with a carbonate sold under the reference Socal P2 by Solvay, this carbonate being formed of pure calcite. The bulk density of the particles was 480 kg/m$^3$.

It was not possible to obtain a sample with an equivalent density exhibiting sufficient strength to be able to be handled and to allow the thermal conductivity to be measured.

Comparative Example 2

The procedure carried out was the same as in the example according to the invention, the particles of carbonate being replaced with particles of aerogels sold under the reference P300 by Cabot. The bulk density of the particles was 65-85 kg/m$^3$.

After dispersion of the particles in the water, a wet paste (and not a fluid dispersion) was obtained, the mixture obtained after addition of the latex binder remaining in the form of a paste. After introducing the aqueous foam into this paste, there was observed, in the event of stopping the stirring, a gradual separation of phases with a fluid aqueous phase below and supernatant aerogel particles. On pouring, after stirring, the mixture into a mold and placing it in an oven at 40° C. overnight, a very fragile product was obtained which exists not in the form of a rigid or solid foam but in the form of a stack of aerogel particles agglomerated by compaction and bonded by the latex binder, the incorporation of the aerogel particles having resulted in the collapse of the preformed aqueous foam.

Moreover, the addition, during the dispersion of the particles in the water, of 5.83 g of a cationic surfactant (in order to render the aerogel particles compatible with the water) sold under the reference Barlox 12 (based on branched alkyldimethylamine oxide) by Lonza did not change the appearance of the mixture obtained (wet paste and not fluid dispersion) nor the observation, after introducing the aqueous foam and stopping the stirring, of a separation of phases (very fluid aqueous phase and supernatant aerogel particles) and resulted, after drying, in a product not exhibiting sufficient strength to allow it to be handled, the aerogel particles being even more weakly agglomerated by the binder.

Comparative Example 3

In this comparative example, an attempt was made to obtain an aerogel foam by in situ foaming as follows:

A solution comprising 120 g of water and 7.5 g of the cationic surfactant Barlox 12 of the preceding comparative example was prepared.

33.75 g of the aerogel particles P300 of the preceding comparative example were dispersed in this solution using an IKA paddle at 1500 rev/min until all of the aerogel particles were wet and then 24 g of a latex (binder) sold by BASF under the reference Acronal 5400 were added to the paste obtained. Mixing was carried out and an attempt was made to make the mixture foam by mechanical action using a food processor of the Kenwood brand at maximum speed for 10 min.

It was not possible to obtain a foam, the mixing retaining the appearance of a paste. On pouring the mixture into a Teflon mold and placing it in an oven at 40° C. overnight, a product was obtained which exists not in the form of a rigid or solid foam but in the form of a stack of compacted aerogel particles bonded by the latex binder exhibiting a density of the order of 200 kg/m$^3$.

The products according to the invention are particularly appropriate for high performance thermal insulation, in particular in the field of the construction industry for insulating the walls (exterior or interior) of buildings or insulating beneath the roof. The products according to the invention also have properties or can be used with advantage in sound insulation and applications in which materials are rendered lighter.

The invention claimed is:

1. A process for the manufacture of a thermal insulating product, comprising:
producing a foam from a mixture comprising a liquid medium and mineral particles based on magnesium and calcium carbonates, wherein the mineral particles are formed of:
a crystallized calcic part comprising at least one carbonate selected from the group consisting of calcite and aragonite; and
a crystallized magnesian part comprising hydromagnesite,
wherein the crystals of the calcic part and the magnesian part are aggregated in the form of a composite aggregate;
shaping the foam, to obtain a shaped foam; and
at least partially drying the foam or the shaped foam.

2. The process as claimed in claim 1, wherein the mixture has a solids content of 15% to 40% by weight, relative to the total weight of the mixture.

3. The process as claimed in claim 1, wherein at least one additive selected from the group consisting of a surfactant, an organic or inorganic binder, a rheological agent, and a reinforcer, is added to the mixture or to the foam.

4. The process as claimed in claim 3, wherein an organic latex binder is added to the mixture or to the foam.

5. A thermal insulating product in the form of a rigid and/or solid foam, comprising mineral particles based on magnesium and calcium carbonates, wherein the mineral particles are formed of:
a crystallized calcic part comprising at least one carbonate selected from the group consisting of calcite and aragonite; and
a crystallized magnesian part comprising hydromagnesite,
wherein the crystals of the calcic part and the magnesian part are aggregated in the form of composite aggregates.

6. The thermal insulating product as claimed in claim 5, wherein the mineral particles are of submicronic porosity, with a pore diameter between 10 nm and less than 1 μm.

7. The thermal insulating product as claimed in claim 5, wherein the mineral particles exhibit a size of at least 500 nm.

8. The thermal insulating product as claimed in claim 5, wherein the mineral particles are of submicronic porosity with a pore volume greater than or equal to 0.8 cm$^3$/g.

9. The thermal insulating product as claimed in claim 5, wherein the mineral particles exhibit a bulk density of greater than or equal to 100 kg/m$^3$ and less than or equal to 250 kg/m$^3$, and a specific surface S of greater than 5 m$^2$/g.

10. The thermal insulating product as claimed in claim 5, wherein the thermal insulating product has a density of less than 300 kg/m$^3$.

11. The thermal insulating product as claimed in claim 5, comprising two different ranges of porosities, a first range consisting of macropores with a diameter between 10 microns and 3 mm, and a second range consisting of submicronic pores with a diameter between 10 nm and less than 1 μm, wherein a total pore volume of the thermal insulating material is greater than 1.8 cm$^3$/g.

12. The thermal insulating product as claimed in claim 5, wherein the thermal insulating material is predominantly inorganic.

13. The thermal insulating product as claimed in claim 5, wherein the magnesian part is crystallized in the form of platelets, wherein the composite aggregates are agglomerated in the form of agglomerates, and wherein the composite aggregates comprise a calcic core on which hydromagnesite platelets are aggregated.

14. The thermal insulating product as claimed in claim 5, wherein the magnesian part further comprises at least one selected from the group consisting of periclase, magnesium oxyhydroxide, and brucite, and the magnesian part is present in an amount ranging from 25% to 65% by weight, with respect to the total weight of the particles.

15. The thermal insulating product as claimed in claim 5, wherein the hydromagnesite is of formula $Mg_5(CO_3)_4(OH)_2 \cdot 4H_2O$ and is present at a content between 10% and 60% by weight, with respect to the weight of the mineral particles.

16. The thermal insulating product as claimed in claim 5, wherein the calcic part further comprises calcium hydroxide, and wherein the calcic part is present in an amount ranging from 35% to 75% by weight, with respect to the total weight of the mineral particles.

17. The thermal insulating product as claimed in claim 5, wherein the Ca/Mg molar ratio in the mineral particles is between 0.4 and 1.2.

18. The thermal insulating product as claimed in claim 5, manufactured from a mixture comprising:
water or an aqueous foam;
the mineral particles, wherein the mineral particles are incorporated in the foam or in the water as a dispersion/suspension, and exhibit a specific surface S greater than 5 m$^2$/g; and
at least one selected from the group consisting of an organic binder, a mineral binder, a surfactant, and a reinforcer.

19. The thermal insulating product as claimed in claim 5, wherein the thermal insulating product is manufactured from a mixture further comprising an organic binder.

20. A process, comprising:
insulating a wall of a building with the thermal insulation product as claimed in claim 5.

* * * * *